US012619506B2

(12) United States Patent
Werner et al.

(10) Patent No.: US 12,619,506 B2
(45) Date of Patent: May 5, 2026

(54) DATACENTER HARDWARE REALLOCATION THROUGH WORKLOAD DISTRIBUTION OPTIMIZATION

(71) Applicant: International Business Machines Corporation, Armonk, NY (US)

(72) Inventors: John S. Werner, Fishkill, NY (US); Arkadiy O. Tsfasman, Wappingers Falls, NY (US); Zachary A. Silverstein, Georgetown, TX (US); Logan Bailey, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 18/736,171

(22) Filed: Jun. 6, 2024

(65) Prior Publication Data

US 2025/0377991 A1 Dec. 11, 2025

(51) Int. Cl.
*G06F 11/20* (2006.01)
(52) U.S. Cl.
CPC ...... *G06F 11/2028* (2013.01); *G06F 11/2023* (2013.01); *G06F 11/2035* (2013.01)
(58) Field of Classification Search
CPC ........ G06F 9/50; G06F 9/5011; G06F 9/5044; G06F 9/505; G06F 11/0709; G06F 11/0754; G06F 11/16; G06F 11/1666; G06F 11/20; G06F 11/202; G06F 11/2028
See application file for complete search history.

(56) References Cited

U.S. PATENT DOCUMENTS

| | | | |
|---|---|---|---|
| 9,424,098 | B2 | 8/2016 | Goh et al. |
| 10,367,353 | B1 | 7/2019 | McNamara et al. |
| 10,601,903 | B2 | 3/2020 | Bivens et al. |

(Continued)

FOREIGN PATENT DOCUMENTS

| | | |
|---|---|---|
| EP | 4060457 A1 | 9/2022 |

OTHER PUBLICATIONS

Hong et al., "Self-maintaining [networked] systems: The rise of datacenter robotics!", Nov. 2024, ACM, 2024 Hot Topics in Networks (Year: 2024).*

(Continued)

*Primary Examiner* — Michael Maskulinski
(74) *Attorney, Agent, or Firm* — Garg Law Firm, PLLC; Rakesh Garg; Rakesh Roy

(57) ABSTRACT

An embodiment includes detecting by a Hardware Management Component of a datacenter, a failure of a hardware in the datacenter. The embodiment includes responsive to the detecting, determining by an Asset Manager Component, a lead time for a replacement of the failed hardware. The embodiment includes determining by the Hardware Management Component a replacement decision based on a priority of a workload deployed on the failed hardware and the lead time. The embodiment includes deciding by the Hardware Management Component whether to replace the failed hardware with a substitute hardware from a lower priority system of the datacenter based on the replacement decision. The embodiment also includes adjusting by a Workload Controller Component the workload deployed on the failed hardware based on the replacement decision.

20 Claims, 4 Drawing Sheets

(56)                  References Cited

U.S. PATENT DOCUMENTS

| | | | |
|---|---|---|---|
| 10,893,096 B2 | 1/2021 | Bivens et al. | |
| 11,221,886 B2 | 1/2022 | Bivens et al. | |
| 11,330,042 B2 | 5/2022 | Bivens et al. | |
| 11,782,631 B2 | 10/2023 | Jayaraman et al. | |
| 2014/0223241 A1* | 8/2014 | Ashok ................. | G06F 11/0793 |
| | | | 714/48 |
| 2018/0027686 A1* | 1/2018 | Adiletta .................. | G06F 9/544 |
| 2018/0365108 A1* | 12/2018 | Johnson .............. | G06F 11/2033 |

OTHER PUBLICATIONS

Powell et al., Architectural Core Salvaging in a Multi-Core Processor for Hard-Error Tolerance, ISCA'09, Jun. 20-24, 2009.
Whyman, Secrets from Cloud Computing's First Stage: An Action Agenda for Government and Industry, Information Technology & Innovation Foundation, Jun. 2021.
Hedberg et al., Faster to the Future: Thinking through the Evolving Security Software Landscape, Imagine 2025, Jul. 6, 2020.
Kilcioglu et al., Competition on Price and Quality in Cloud Computing, WWW 2016, Apr. 11-15, 2016.
ip.com, Fine-Grained Reconfiguration of Deep Learning Hardware for Performance and Power Optimization, Jan. 16, 2019.
ip.com, A New Method for the Design and Deployment of IT Workload Optimized Systems, Jun. 15, 2010.
ip.com, Optimized Methodology to Predict Application Performance Using Hardware Performance Counter Data on Surrogate Workloads, Feb. 25, 2010.
ip.com, Algorithm for Workload Prediction to Assist Various Applications, Jul. 8, 2021.

* cited by examiner

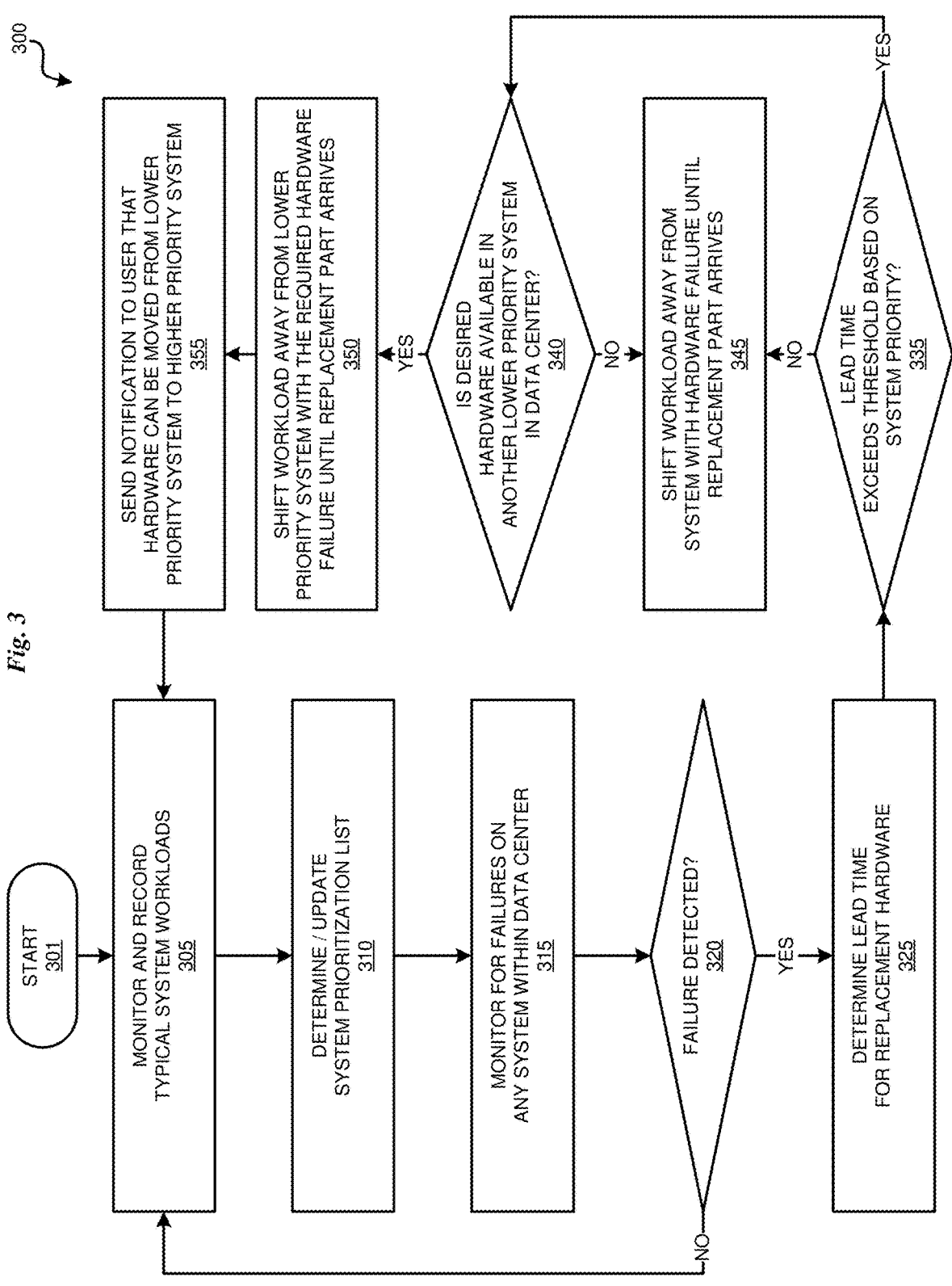

START
301

MONITOR AND RECORD
TYPICAL SYSTEM WORKLOADS
305

DETERMINE / UPDATE
SYSTEM PRIORITIZATION LIST
310

MONITOR FOR FAILURES ON
ANY SYSTEM WITHIN DATA CENTER
315

FAILURE DETECTED?
320

DETERMINE LEAD TIME
FOR REPLACEMENT HARDWARE
325

LEAD TIME
EXCEEDS THRESHOLD BASED ON
SYSTEM PRIORITY?
335

SHIFT WORKLOAD AWAY FROM
SYSTEM WITH HARDWARE FAILURE UNTIL
REPLACEMENT PART ARRIVES
345

IS DESIRED
HARDWARE AVAILABLE IN
ANOTHER LOWER PRIORITY SYSTEM
IN DATA CENTER?
340

SHIFT WORKLOAD AWAY FROM LOWER
PRIORITY SYSTEM WITH THE REQUIRED HARDWARE
FAILURE UNTIL REPLACEMENT PART ARRIVES
350

SEND NOTIFICATION TO USER THAT
HARDWARE CAN BE MOVED FROM LOWER
PRIORITY SYSTEM TO HIGHER PRIORITY SYSTEM
355

YES

NO

YES

NO

YES

400

HARDWARE MANAGEMENT COMPONENT
420

ASSET MANAGER COMPONENT
430

WORKLOAD CONTROLLER
440

DEPLOYMENT COMPONENT
450

CPU
460

DATACENTER HARDWARE REALLOCATION THROUGH WORKLOAD DISTRIBUTION OPTIMIZATION

BACKGROUND

The present invention relates generally to datacenters. More particularly, the present invention relates to a method, system, and computer program for Datacenter Hardware Reallocation Through Workload Distribution Optimization.

Datacenters play a key role in today's technology infrastructure, ensuring secure storage and the necessary connectivity to supply a vast range of services, including website hosting, business data storage, financial transaction processing and much more. Datacenters largely comprise of servers, cooling and ventilation, backup power, software virtualization and management, network connection, and monitoring and maintenance systems. The average datacenter has about 100,000 servers, over 10,000 switches, and thousands of related hardware. Achieving overall operational reliability and efficiency is difficult when system parts fail. Sudden failure can affect resource utilization across a distributed compute network of a datacenter, and may cause severe disruption to critical services.

The ability to dynamically reallocate components generates optimization capabilities in light of supply chain constraints that may reduce system optimization and reliability. In the face of external constraints, the ability to dynamically share hardware resources and workloads across the distributed system in a datacenter allows organizations to leverage internal resources to "bridge the gap" and run at a "relative optimal level" when constrained by external suppliers.

SUMMARY

The illustrative embodiments provide for Datacenter Hardware Reallocation Through Workload Distribution Optimization. An embodiment includes detecting by a Hardware Management Component of a datacenter, a failure of a hardware in the datacenter. The embodiment includes responsive to the detecting, determining by an Asset Manager Component, a lead time for a replacement of the failed hardware. The embodiment includes determining by the Hardware Management Component a replacement decision based on a priority of a workload deployed on the failed hardware and the lead time. The embodiment includes deciding by the Hardware Management Component whether to replace the failed hardware with a substitute hardware from a lower priority system of the datacenter based on the replacement decision. The embodiment also includes adjusting by a Workload Controller Component the workload deployed on the failed hardware based on the replacement decision.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a flowchart diagram in an environment in accordance with an illustrative embodiment.

DETAILED DESCRIPTION

Figure 1:
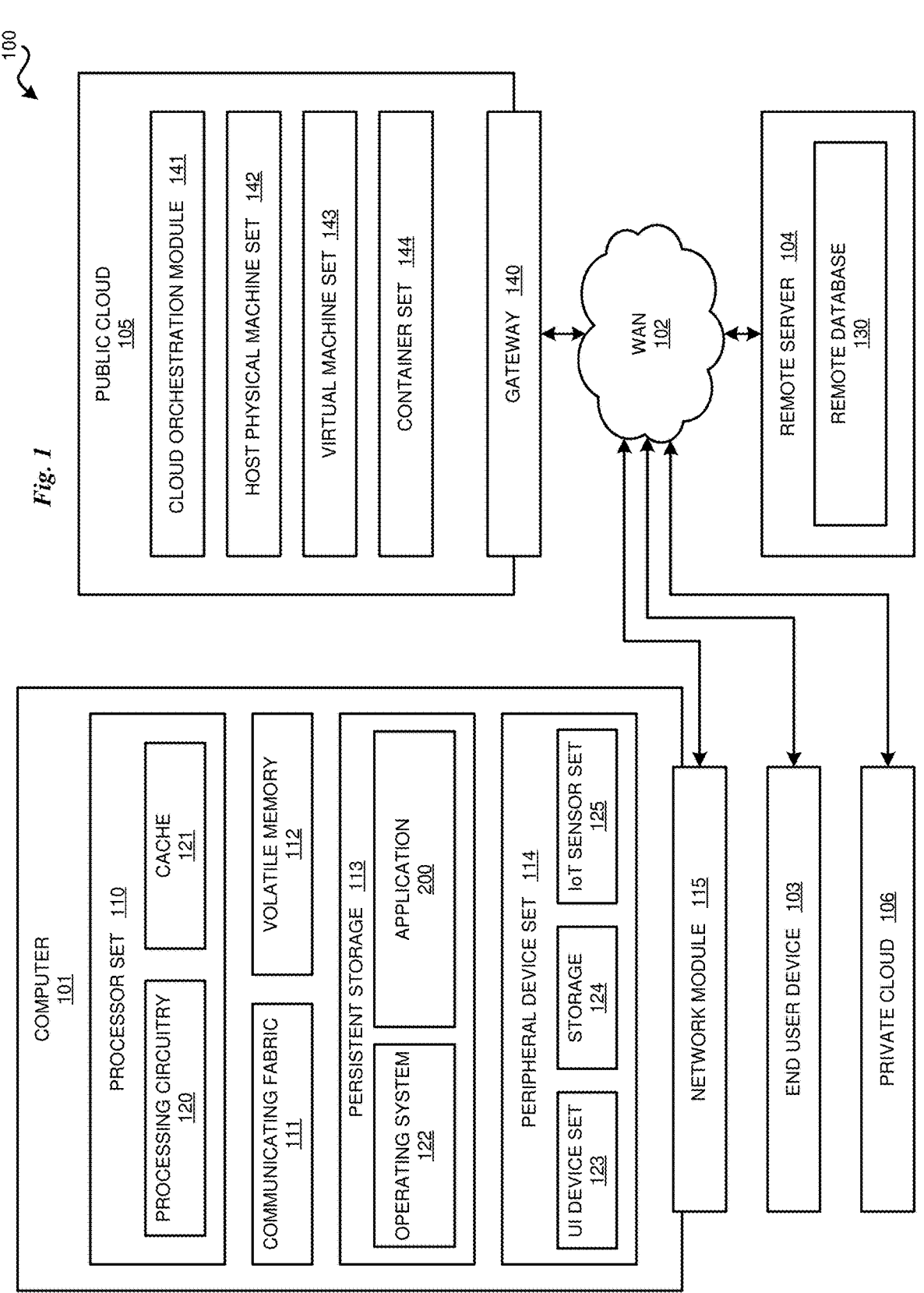
FIG. 1 depicts a block diagram of a computing environment in accordance with an illustrative embodiment.

Datacenters play a key role in today's technology infrastructure, ensuring secure storage and the necessary connectivity to supply a vast range of services, including website hosting, business data storage, financial transaction processing and much more. Datacenters largely comprise of servers and hardware, cooling and ventilation, backup power, software virtualization and management, network connection, and monitoring and maintenance systems. The average datacenter has about 100,000 servers, over 10,000 switches, and thousands of related hardware. Achieving overall operational reliability and efficiency is difficult when system parts fail. Sudden failure can affect resource utilization across a distributed compute network of a datacenter, and may cause severe disruption to critical services.

The ability to dynamically reallocate components generates optimization capabilities in light of supply chain constraints that may reduce system optimization and reliability. In the face of external constraints, the ability to dynamically share hardware resources and workloads across the distributed system in a datacenter allows organizations to leverage internal resources to "bridge the gap" and run at a "relative optimal level" when constrained by external suppliers. Datacenters are made up of different types of hardware systems from potentially different vendors and adding to the complexity and support are different governing protocols. Some devices are accompanied by software to manage them, but there are no valid approaches for end-to-end compute to storage network testing and validation.

The present disclosure addresses the deficiencies described above by providing a method, a machine-readable medium, and a system for Datacenter Hardware Reallocation Through Workload Distribution Optimization. An embodiment includes detecting by a Hardware Management Component of a datacenter, a failure of a hardware in the datacenter. The embodiment includes responsive to the detecting, determining by an Asset Manager Component, a lead time for a replacement of the failed hardware. The embodiment includes determining by the Hardware Management Component a replacement decision based on a priority of a workload deployed on the failed hardware and the lead time. The embodiment includes deciding by the Hardware Management Component whether to replace the failed hardware with a substitute hardware from a lower priority system of the datacenter based on the replacement decision. The embodiment also includes adjusting by a Workload Controller Component the workload deployed on the failed hardware based on the replacement decision. Thus, the embodiment provides a method of datacenter hardware reallocation through workload distribution optimization. Other embodiments of this aspect include a machine-readable medium, and a system.

Illustrative embodiments include where the adjusting further comprises transferring by the Workload Controller Component the workload from the failed hardware. Thus, the embodiment provides additional detail of where the adjusting further comprises transferring by the Workload Controller Component the workload from the failed hardware in a method of datacenter hardware reallocation through workload distribution optimization.

Illustrative embodiments include where the replacement decision further comprises comparing the lead time with a threshold based on the priority of the workload deployed on the failed hardware. Thus, the embodiment provides additional detail of where the replacement decision further comprises comparing the lead time with a threshold based on the priority of the workload deployed on the failed hardware in a method of datacenter hardware reallocation through workload distribution optimization.

Illustrative embodiments include where a Deployment Controller controls a robot to install the substitute hardware. Thus, the embodiment provides additional detail of where a Deployment Controller controls a robot to install the substitute hardware in a method of datacenter hardware reallocation through workload distribution optimization.

Illustrative embodiments include where the replacement decision is based on comparing the priority of the failed hardware against a priority metric of the datacenter. Thus, the embodiment provides additional detail of where the replacement decision is based on comparing the priority of the failed hardware against a priority metric of the datacenter in a method of datacenter hardware reallocation through workload distribution optimization.

Illustrative embodiments include further comprising replacing the substitute hardware with a replacement hardware. Thus, the embodiment provides additional detail of further comprising replacing the substitute hardware with a replacement hardware in a method of datacenter hardware reallocation through workload distribution optimization.

Illustrative embodiments also include further comprising transferring by the Workload Controller Component a workload from the substitute hardware from the lower priority system of the datacenter. Thus, the embodiment provides additional detail of further comprising transferring by the Workload Controller Component a workload from the substitute hardware from the lower priority system of the datacenter in a method of datacenter hardware reallocation through workload distribution optimization.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Datacenter environment 100 contains an example of an environment for the execution of at least some of the computer code involved in performing the inventive methods, such as an Application module 200 that provides Datacenter Hardware Reallocation Through Workload Distribution Optimization. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
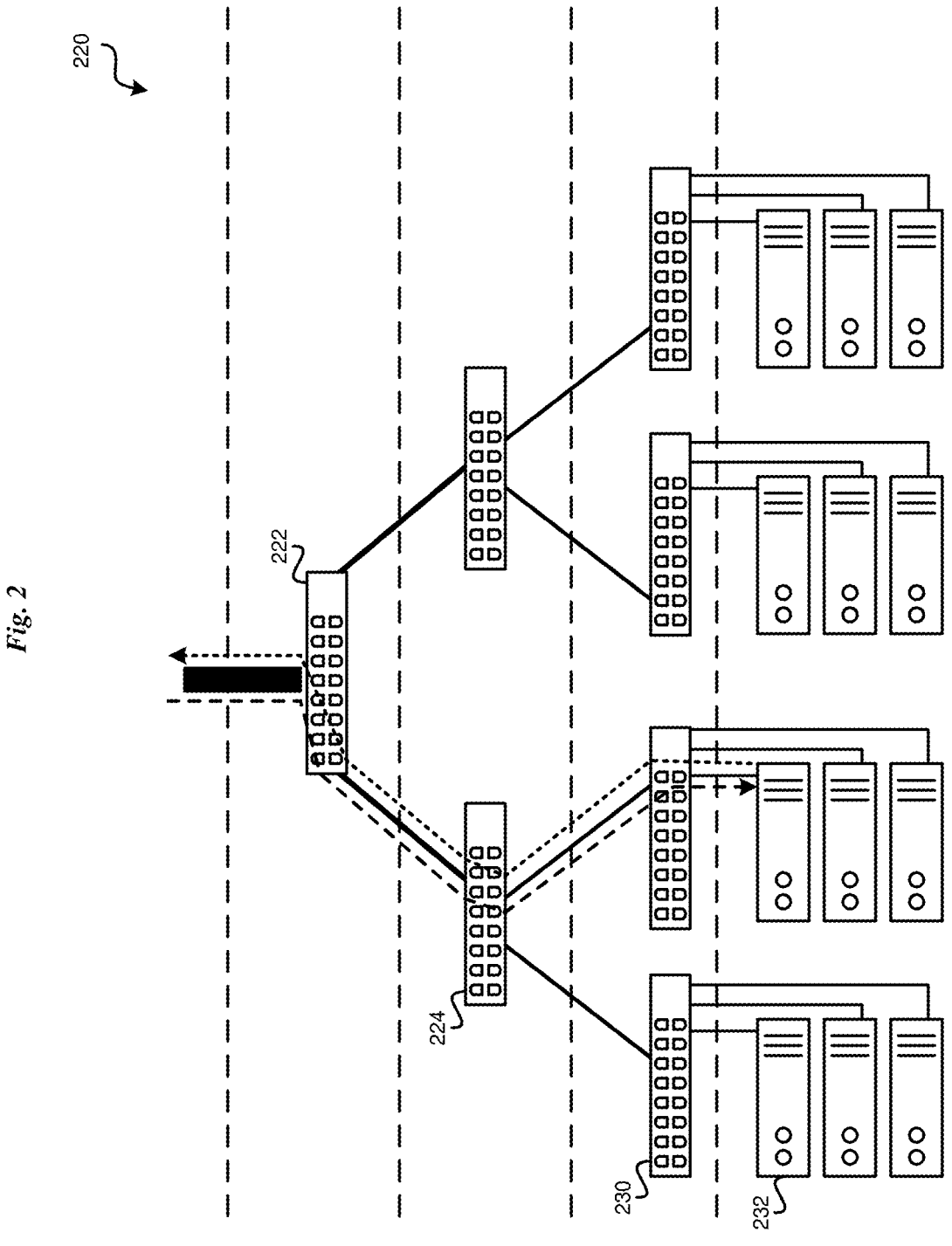
FIG. 2 depicts a diagram in an environment in accordance with an illustrative embodiment.

FIG. 2 depicts a diagram in an environment in accordance with an illustrative embodiment. In a particular embodiment, the components of the diagram 220 show aspects of the Application 200 of FIG. 1.

In the illustrated embodiment, a datacenter is depicted comprising of servers 232, network controllers 230, load balancers 224, and an infrastructure manager 222. The servers 232 may be either racks or blade servers on which workloads are deployed. For example, workloads may be deployed on compute nodes for data storage, processing and computations, website and application hosting, cloud services, backup and data recovery, transactions, multimedia content broadcasting, business and customer resources, and security services. Datacenter network controllers 230 may comprise of switches, routers, and other hardware components that work together to provide the connectivity and security needed to run applications and process data. An infrastructure manager 222 ensures a holistic view to the health state of the entire infrastructure and efficient options in case of system failures. In embodiments, an infrastructure manager may comprise of a Hardware Management Component, that manages the lifecycle of the hardware systems in the datacenter, from initial installation, maintenance to detecting failures. The hardware systems may comprise any part described herein including, but not limited to, fans, cooling units, Input Output cards, DIMMs, processors, power supply units, power distribution units, switches, and cables.

An Asset Manager Component of the infrastructure component may keep a record of the hardware assets including vendor information, service life of a hardware, and location of the hardware in the datacenter. A Workload Controller calculates and maintains a priority list of the workloads deployed on the systems of the datacenter.

FIG. 3 depicts a flowchart diagram in an environment in accordance with an illustrative embodiment. In a particular embodiment, the components of the diagram 300 show aspects of the Application 200 of FIG. 1.

In the illustrated embodiment, the flowchart starts at block 301, and then by block 305 when the system monitors and records system workloads. A Workload Controller may determine and update a system prioritization list at block 310. In an embodiment, the Workload Controller may compute the priority metric of the workloads on the hardware systems in the datacenter by searching a mapping table of the workloads in the datacenter and computing an objective function, where the objective function can include factors, such as service level agreement, customer preference, and the number of transactions. A Hardware Management Component monitors for failures on any system within the datacenter at block 315. If a failure is not detected at block 320, the process repeats from block 305.

If a failure is detected at block 320, the Asset Manager Component determines the lead time for the replacement hardware at block 325. For example, the Asset Manager Component may extract vital product data (VPD) from all connected systems, communicate with a vendor ordering system or database to request part information such as lead times and/or put in a request for quote (RFQ). At block 335, the Hardware Management Component determines a replacement decision for example, whether the lead time exceeds a threshold based on the failed hardware system's priority. In some embodiments, the threshold may be short for high priority systems (e.g., 1 day) and longer for low priority systems (e.g., 2 weeks). In other embodiments, the threshold may be based on the specific type of hardware that failed, for example, a Dual In-Line Memory Module (DIMM) may have a shorter threshold than a redundant power supply. If the lead time does not exceed a threshold, the replacement decision may be to order the replacement hardware.

In some embodiments, if the lead time exceeds a threshold, the Hardware Management Component decides whether to replace the failed hardware with a substitute hardware from a lower priority system of the datacenter by asking if a desired hardware is available in another lower priority system in the datacenter at block 340. The Hardware Management Component may determine a substitute hardware of the failed hardware by performing a look up in a hardware table and comparing the priority of the failed hardware against a priority metric of the hardware in the datacenter. The Hardware Management Component may also communicate with the Asset Manager Component to extract vital product data (VPD) from all connected systems. In some embodiments, even if an exact match is not found, a suitable substitute hardware may be determined. For example, a best fit algorithm may be executed based on the specifications of the failed hardware to find hardware that best fits the specifications even if the specifications such as the vendor are different. Similar algorithms such as cluster analysis may also be executed.

If the hardware exists in a lower priority system within the datacenter, and if the lead time exceeds a threshold, the Workload Controller adjusts the workload deployed on the lower priority system with the desired substitute hardware by transferring the workload away from the lower priority system at block 350. This is done in preparation of the movement of the substitute hardware to ensure that the lower priority system utilization is brought down to a point where the remaining hardware can handle the workload and does not get overstress which could cause it to fail sooner. At block 355, a notification is sent to the user that the substitute hardware can be moved from the lower priority system to the higher priority system. The system continues to monitors and records system workloads at block 305. In another embodiment, the substitute hardware is replaced with a replacement hardware that the Asset Manager Component orders from the vendor.

In some embodiments, if the hardware does not exist in a lower priority system within the datacenter and if the lead time exceeds a threshold, the Workload Controller adjusts the workload deployed on the failed hardware by transferring the workload to another system or suspending the workload to ensure that the system utilization is brought down to a point where the remaining hardware can handle the workload. In other embodiments, if the lead time does not exceed a threshold, the Workload Controller transfers the workload away from the failed hardware system until the replacement hardware arrives and is brought back into operation at block 345.

Figure 4:
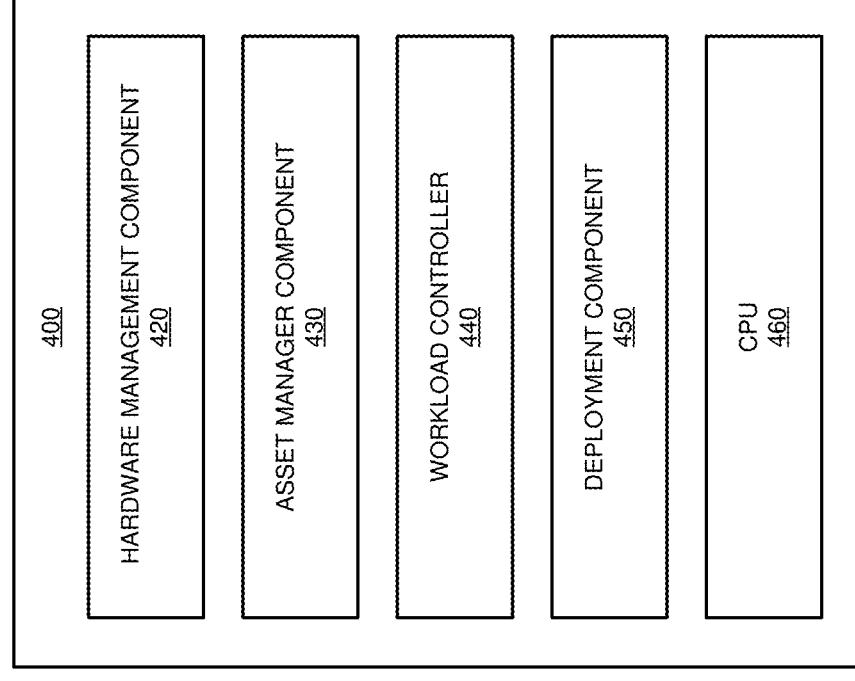
FIG. 4 depicts a system diagram in accordance with an illustrative embodiment.

FIG. 4 depicts a system diagram in accordance with an illustrative embodiment. In a particular embodiment, the components of the diagram 400 are representative of aspects of the Application 200 of FIG. 1.

In the illustrated embodiment, a system comprises a Hardware Management Component 420, an Asset Manager Component 430, a Workload Controller 440, a Deployment Component 450, and a Central Processing Unit 460. In some embodiments, the system may be a datacenter infrastructure manager (DCIM) that manages the infrastructure of a datacenter or across several datacenters. The DCIM may further comprise a Hardware Management Component 420 which may be deployed in a datacenter or across one datacenter to manage the hardware systems in the datacenter. In embodiments, the Hardware Management Component 420 may comprise a machine learning model that is trained on hardware specifications and apply machine learning algorithms to determine a substitute hardware. The Asset Manager Component 430 may extract vital product data (VPD) from all connected systems by executing application programming interface (API) calls. The VPD may then be used to train the machine learning model of the Hardware Management Component 420, for example, the features of the model are the product data. In embodiments, the Deployment Controller may control a robot system through Programmable logic controllers (PLC) to deploy and install the replacement or substitute hardware. For example, the PLC may be programmed with parameters from the Hardware Management Component or the Asset Manager Component to identify and locate the hardware. A Workload Controller 440 may include load balancers, database and virtual machine (VM) controllers, and dispatchers.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method enhancing a distributed system of a datacenter comprising:

detecting, by a Hardware Management Component of the datacenter, a failure of a failed hardware in the datacenter;

responsive to the detecting, determining by an Asset Manager Component, the Asset Manager Component extracting hardware data for the failed hardware by executing an application programming interface call on the failed hardware, a lead time for a replacement of the failed hardware;

determining by injecting the hardware data into the Hardware Management Component to output a replacement decision based on a priority of a workload deployed on the failed hardware and the lead time;

deciding by the Hardware Management Component whether to replace the failed hardware with a substitute hardware from a lower priority system of the datacenter based on the replacement decision; and adjusting by a Workload Controller Component the workload deployed on the failed hardware based on the replacement decision, the distributed system is enhanced wherein the workload of the failed hardware of the distributed system is dynamically reallocated from the failed hardware to the substitute hardware.

2. The computer-implemented method of claim 1, wherein the adjusting further comprises transferring by the Workload Controller Component the workload from the failed hardware.

3. The computer-implemented method of claim 2, wherein the replacement decision further comprises comparing the lead time with a threshold based on the priority of the workload deployed on the failed hardware.

4. The computer-implemented method of claim 1, wherein a Deployment Controller controls a robot to install the substitute hardware.

5. The computer-implemented method of claim 1, wherein the replacement decision is based on comparing the priority of the failed hardware against a priority metric of the datacenter.

6. The computer-implemented method of claim 1, further comprising replacing the substitute hardware with a replacement hardware.

7. The computer-implemented method of claim 1, further comprising transferring by the Workload Controller Component a workload from the substitute hardware from the lower priority system of the datacenter.

8. A computer program product comprising one or more computer readable storage media, and program instructions collectively stored on the one or more computer readable storage media, the program instructions executable by a processor to cause the processor to perform operations enhancing a distributed system of a datacenter comprising:

detecting, by a Hardware Management Component of the datacenter, a failure of a failed hardware in the datacenter;

responsive to the detecting, determining by an Asset Manager Component, the Asset Manager Component extracting hardware data for the failed hardware by executing an application programming interface call on the failed hardware, a lead time for a replacement of the failed hardware;

determining by injecting the hardware data into the Hardware Management Component to output a replacement decision based on a priority of a workload deployed on the failed hardware and the lead time;

deciding by the Hardware Management Component whether to replace the failed hardware with a substitute hardware from a lower priority system of the datacenter based on the replacement decision; and adjusting by a Workload Controller Component the workload deployed on the failed hardware based on the replacement decision, the distributed system is enhanced wherein the workload of the failed hardware of the distributed system is dynamically reallocated from the failed hardware to the substitute hardware.

9. The computer program product of claim 8, wherein the adjusting further comprises transferring by the Workload Controller Component the workload from the failed hardware.

10. The computer program product of claim 8, wherein the replacement decision further comprises comparing the lead time with a threshold based on the priority of the workload deployed on the failed hardware.

11. The computer program product of claim 8, wherein a Deployment Controller controls a robot to install the substitute hardware.

12. The computer program product of claim 8, wherein the replacement decision is based on comparing the priority of the failed hardware against a priority metric of the datacenter.

13. The computer program product of claim 8, further comprising replacing the substitute hardware with a replacement hardware.

14. The computer program product of claim 8, further comprising transferring by the Workload Controller Component a workload from the substitute hardware from the lower priority system of the datacenter.

15. A computer system comprising a processor and one or more computer readable storage media, and program instructions collectively stored on the one or more computer readable storage media, the program instructions executable by the processor to cause the processor to perform operations enhancing a distributed system of a datacenter comprising:

detecting, by a Hardware Management Component of the datacenter, a failure of a failed hardware in the datacenter;

responsive to the detecting, determining by an Asset Manager Component, the Asset Manager Component extracting hardware data for the failed hardware by executing an application programming interface call on the failed hardware, a lead time for a replacement of the failed hardware;

determining by injecting the hardware data into the Hardware Management Component to output a replacement decision based on a priority of a workload deployed on the failed hardware and the lead time;

deciding by the Hardware Management Component whether to replace the failed hardware with a substitute hardware from a lower priority system of the datacenter based on the replacement decision; and adjusting by a Workload Controller Component the workload deployed on the failed hardware based on the replacement decision, the distributed system is enhanced wherein the workload of the failed hardware of the distributed system is dynamically reallocated from the failed hardware to the substitute hardware.

16. The computer system of claim 15, wherein the adjusting further comprises transferring by the Workload Controller Component the workload from the failed hardware.

17. The computer system of claim 15, wherein the replacement decision further comprises comparing the lead time with a threshold based on the priority of the workload deployed on the failed hardware.

18. The computer system of claim 15, wherein the replacement decision is based on comparing the priority of the failed hardware against a priority metric of the datacenter.

19. The computer system of claim 15, further comprising replacing the substitute hardware with a replacement hardware.

20. The computer system of claim 15, further comprising transferring by the Workload Controller Component a workload from the substitute hardware from the lower priority system of the datacenter.

* * * * *